Nov. 3, 1925.
T. S. HAMILTON
ATTACHMENT FOR VEHICLE SPRINGS
Original Filed March 26, 1924
1,560,082
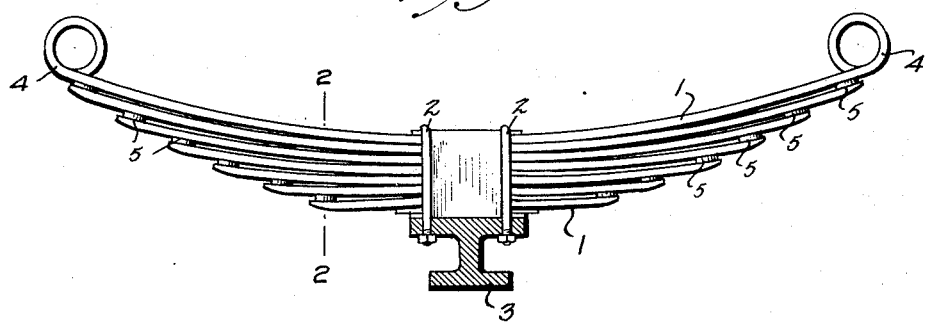
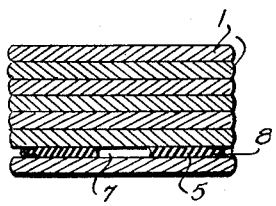
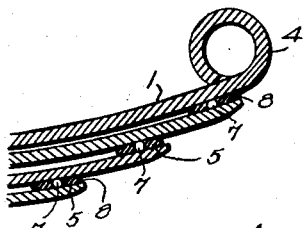
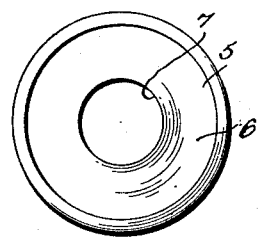
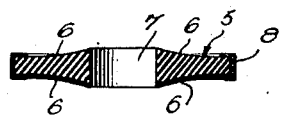
Inventor
THOMAS S. HAMILTON
By
Attorney Patented Nov. 3, 1925.

1,560,082

UNITED STATES PATENT OFFICE.

THOMAS S. HAMILTON, OF LOS ANGELES, CALIFORNIA.

ATTACHMENT FOR VEHICLE SPRINGS.

Application filed March 26, 1924, Serial No. 702,093. Renewed April 22, 1925.

*To all whom it may concern:*

Be it known that I, THOMAS S. HAMILTON, a citizen of the United States, residing at Los Angeles, in the county of Los Angeles and State of California, have invented certain new and useful Improvements in Attachments for Vehicle Springs, of which the following is a specification.

This invention relates to attachments for vehicle springs, and more particularly to an insert adapted to be arranged between the leaves of the spring.

An object of the invention is the provision of a separator for spring leaves formed of rubber or other cushioning material which is adapted to be placed between the leaves of the spring to elminate friction, noise, and breaking or crystallization of the leaves.

A further object of the invention is the provision of an insert that may be easily installed and is inexpensive to manufacture.

In the preferred form of the invention, I provide a member of rubber similar to a washer having a central opening. When the device is placed in position, the air in the opening is compressed, producing the effect of a compressed air shock absorber.

The edges of the cushion may be provided with a coating formed of bi-chromate gelatin compound or other similar material which will act as a seal and prevent oil, moisture, and the like, from getting between the face of the spring and the insert and destroying the insert.

In the accompanying drawing, I have shown one embodiment of the invention. In this showing:

Figure 1 is a side elevation of an ordinary type of leaf spring showing the invention applied, Figure 2 is a transverse sectional view on line 2—2 of Figure 1, Figure 3 is a longitudinal sectional view through the ends of several of the leaves of a spring, Figure 4 is a plan view of the insert removed, and, Figure 5 is a transverse sectional view.

Referring to the drawings, the reference numeral 1 designates the leaves of a spring. As shown, the spring is of the usual construction, formed of a number of leaves all varying in length, the longest leaf being arranged at the top of the spring in the usual manner, and the shortest leaf at the bottom. The center of the leaves are connected by suitable clips 2, adapted to be secured to the axle 3 of a vehicle and the ends of the upper leaf are provided with suitable coils 4 for the reception of suitable fastening elements (not shown) by means of which the spring is secured to the body.

The insert forming the subject matter of the invention is shown in detail in Figures 4 and 5 of the drawings. As stated, it is formed of rubber or other cushioning material and comprises a body portion 5 which may be of any desired shape and which is shown circular. The upper and lower faces may be concaved from the center to the outer edge, as at 6, and the insert may be provided with a central opening 7. The outer edges of the insert may be provided with a coating of bi-chromate gelatin compound, as indicated at 8. Other substances that will exclude moisture and oil may be employed in place of the bi-chromate gelatin compound.

In the use of the insert, the end of each leaf is separated from the next adjacent leaf and the insert placed in position, as shown in Figures 1 and 3 of the drawings. When the insert is placed in the spring, it is compressed and retained in position by compression. The air in the opening 7 is also compressed, producing the effect of a compressed air shock absorber.

As stated, the insert eliminates squeaking caused by the leaves of the spring contacting with each other and also prevents breaking of the spring leaves due to crystallization. When the outer edges of the insert are provided with the coating of an oil and water repelling substance, the life of the insert is materially increased as the normal wear, due to the movement of the spring leaves, is negligible.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. An insert for leaf springs comprising a compressible member adapted to be inserted between the leaves of a spring and retained in position by compression, the edges of said member being provided with a coating of material adapted to form a seal to exclude moisture and oil.

2. An insert for leaf springs comprising a compressible member adapted to be inserted between the leaves of a spring and retained in position by compression, said member being provided with a central opening.

3. An insert for leaf springs comprising a substantially circular member formed of rubber adapted to be inserted between the leaves of a spring and retained in position by compression, said member being provided with a central opening.

4. An insert for leaf springs comprising a substantially circular member formed of rubber adapted to be inserted between the leaves of a spring and retained in position by compression, said member being provided with a central opening, and being further provided with concaved upper and lower surfaces.

5. An insert for leaf springs comprising a substantially circular member formed of rubber adapted to be inserted between the leaves of a spring and retained in position by compression, said member being provided with a central opening and being further provided with concaved upper and lower surfaces, the edges of said member being provided with a coating of an oil and water repelling substance.

6. An insert for leaf springs formed of compressible elastic material adapted to be inserted between the leaves of a spring, said insert being provided with an air space closed when the insert is in operative position between the spring leaves whereby the air in the air space is trapped and adapted to resiliently resist diminution of the air space upon compression of the insert.

7. An insert for leaf springs formed of compressible elastic material adapted to be inserted between the leaves of a spring and retained in position by compression, said insert being provided with a space containing air which space is sealed when the insert is inserted between the spring leaves whereby the air in the air space is trapped and adapted to resiliently resist diminution of the air space upon compression of the insert.

8. A vehicle spring comprising a plurality of spring leaves, and a series of unattached rubber members, each of said members being disposed wholly between a pair of the spring leaves adjacent the end of one of said leaves.

9. A vehicle spring comprising a plurality of spring leaves, and a series of unattached rubber members inserted between said leaves adjacent the ends of each leaf, said rubber members being provided with air spaces in which bodies of air are trapped to resiliently resist diminution of the air spaces upon compression of said members.

In testimony whereof, I affix my signature.

THOMAS S. HAMILTON.